United States Patent [19]

Bryer

[11] 3,942,371

[45] Mar. 9, 1976

[54] BUBBLE GENERATING DEVICES

[75] Inventor: Denis William Bryer, New Malden, England

[73] Assignee: National Research Development Corporation, London, England

[22] Filed: July 26, 1974

[21] Appl. No.: 492,970

[30] Foreign Application Priority Data

Aug. 1, 1973 United Kingdom............... 36491/73

[52] U.S. Cl. ................................................. 73/147
[51] Int. Cl.² ......................................... G01M 9/00
[58] Field of Search............................ 73/147; 46/8

[56] References Cited
UNITED STATES PATENTS

| 2,134,890 | 11/1938 | Redon | 46/8 |
|---|---|---|---|
| 2,941,695 | 6/1960 | Rich | 46/8 |

OTHER PUBLICATIONS

Norstar Corp., 1966, Catalog, "Bubble Sax", 161, 3-10-66.

Primary Examiner—Donald O. Woodiel
Attorney, Agent, or Firm—Cushman, Darby & Cushman

[57] ABSTRACT

A bubble generating device consisting of two tube assemblies presenting a substantially linear support portion leading into a second portion of generally U-shape. In operation liquid is passed through the annular space between the two assemblies and air or some other gas is passed down the inner of the two assemblies. In one of the embodiments described, only one tube assembly is present. This latter embodiment can be used to provide bubbles in liquid flows, gas or coloured liquid being passed through the device in such cases.

8 Claims, 9 Drawing Figures

BUBBLE GENERATING DEVICES

The present invention relates to a device for generating bubbles, e.g., for use in flow visualisation techniques in a gaseous flow.

Bubble generating devices are already known which in essence comprise two co-axial tubes bent or mitred so that, in operation, one portion of the device extends across the flow to be indicated and this supports a second portion arranged co-axially with this flow and terminating (at its downstream end) in an exit part. Bubbles are formed at this part from a gaseous flow passing through the inner of the two tubes, and a liquid flow passing through the annular space between the two tubes.

The whole purpose of the device in flow visualisation techniques is of course that the bubbles should accurately indicate the direction of the gaseous flow in which the exit part of the device is located.

Unfortunately, with existing bubble generating devices however, the stream of bubbles does not indicate the direction followed by the gaseous stream in the absence of the bubble generating device because the wake of the device deflects the stream of bubbles towards the support portion side of the exit part.

According to the present invention, a device for generating bubbles in a fluid flow includes one or two passageways defined, in part, by a substantially linear support portion of the device and, in part, by a shaped second portion of the device which terminates as an outlet port for the or each passageway, the second portion of the device extending beyond the support portion and bending away from and then back towards an extension of the axis of the support portion.

Conveniently, the passages are provided by two tube assemblies one within the other. In such cases, the inner assembly preferably stops short of the outer one at the outlet port of the device e.g., by an amount equal to half the internal diameter of the outer assembly of said port.

Preferably the tubes in the two assemblies are co-axial at least immediately adjacent the outlet port of the device.

In preferred embodiments, the second portion of the device terminates as a substantially straight section lying substantially perpendicular to the axis of the support portion.

Conveniently the outlet port of the device lies on the extension of the support portion axis.

The device may be of "swan-necked" form with the second portion bent in a generally U-shape.

The invention also includes an assembly comprising the combination of a bubble generating device according to the present invention with a supply of liquid for the passageway or, if two such passageways are present, for the innermost of these two passageways, and, if said two passageways are present, a supply of air for the outermost of the two passageways.

The invention further includes a bubble generating system including such an assembly and a wind tunnel or other such fluid flow assembly, the outlet port of the device lying on or near the axis of said apparatus if desired.

Embodiments of the invention are shown, by way of example, only, in the accompanying drawings in which.

Figure 1:
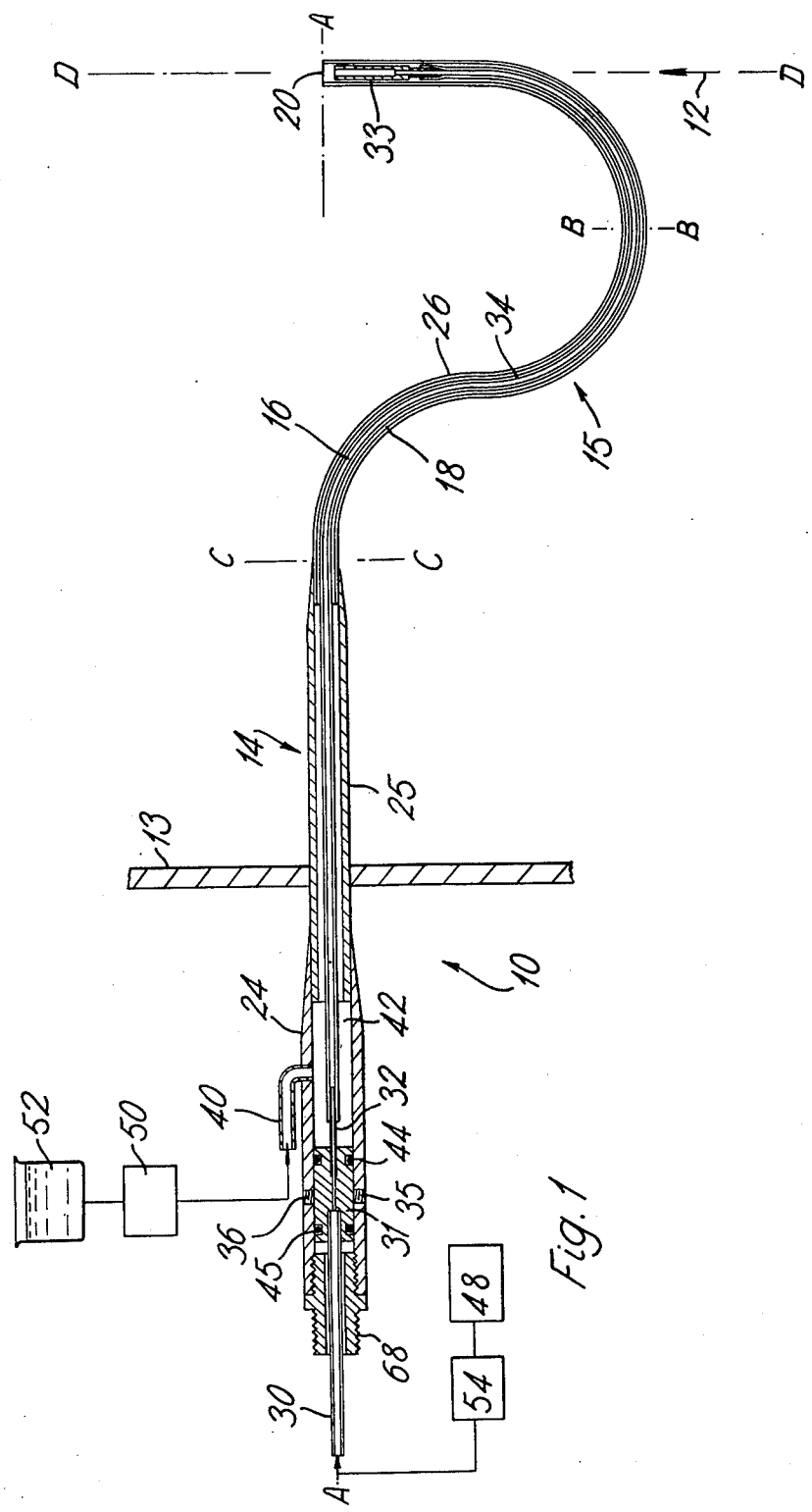
FIG. 1 is a partially diagrammatic cross-sectional plan view of a bubble generating system utilising a first embodiment of a device (shown to scale) in accordance with the present invention.
Figure 2:
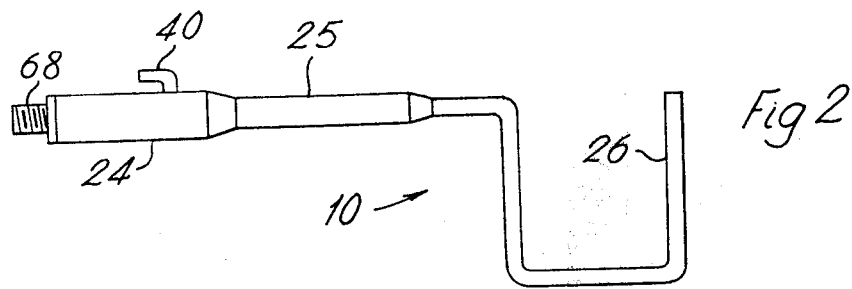
FIGS. 2 – 5 show, on a reduced scale, plan views of alternative embodiments of the device.
Figure 3:
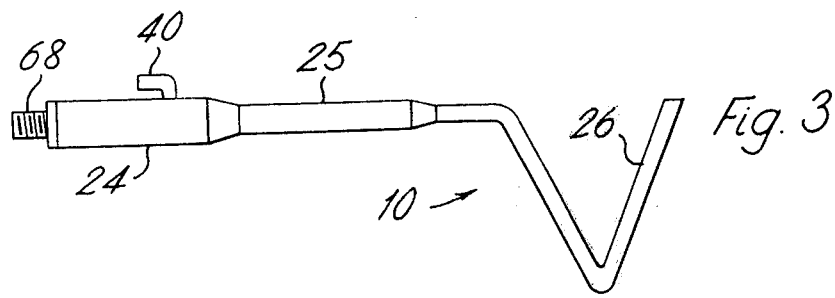
Figure 4:
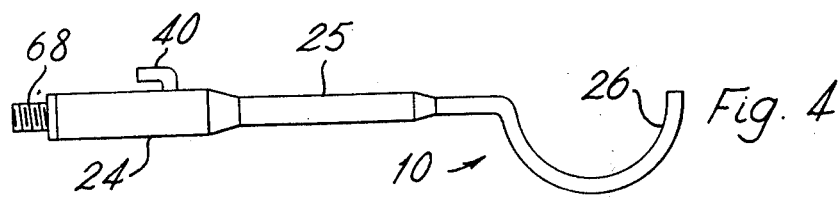
Figure 5:
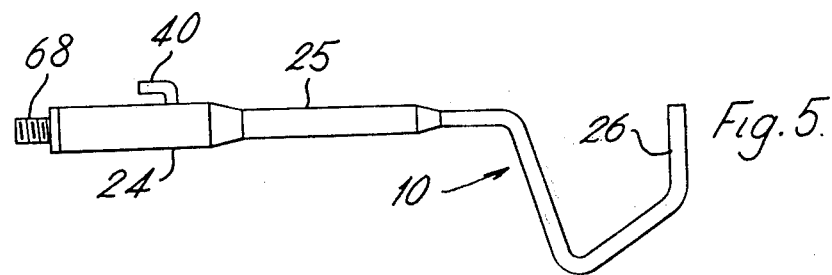

Thus referring first to FIG. 1, this shows a device 10, in accordance with the present invention, for generating bubbles in an air flow 12 of a rectangular section wind tunnel 13.

The device includes a substantially linear support portion 14 leading into a shaped second portion 15 and these together define a first passageway 16 passing along the centre line of the device and an annular second passageway 18 surrounding the first passageway. The passageways terminate at the discharge section 20 of the device which should be parallel to, e.g. aligned with, the axis DD of the wind tunnel. Only one wall (13) of the tunnel is shown in the Figure. It will be observed that the shaped second portion of the device (to the right of line CC as viewed in FIG. 1) bends first away from the extended axis AA of support portion 14 and then (to the right of line BB) back towards that axis to meet it, in the illustrated embodiment, at the outlet port of the device.

In more detail the device comprises a series of interfitting brass or stainless steel tubes 24–26 which enclose a series of inner tubes 30–34. Tube 31 can be locked in tube 24 by means of grub screws 35, 36 to fix the axial position of the inner series of tubes relative to the series of outer tubes, and as inner tube 33 should preferably stop short of the discharge end 20 of the device by some predetermined amount, tube 34 is made of flexible material e.g., nylon, to allow a measure of adjustment during assembly before the grub screws are screwed home. In accordance with a preferred feature of the invention for example the ratio of the distance by which tube 33 stops short of tube 26 to the internal diameter of the tube 26 is about 1:2. In the illustrated embodiment for example the inner tube stops short by about 4 mm and the internal diameter of tube 26 is 3/16 inch. Apart from tube 34, the rest of the inner tubes are made of brass or stainless steel.

Although for reasons of clarity, it has not been shown in the drawing, the outside of tube 33 is axially splined (except for the last ⅛ inch or so) in order to hold it centrally within outer tube 26. Having the final length of tube 33 without splines allows the flows passing between the splines to join up again before they reach the end of tube 33.

A branch pipe 40 leads into a chamber 42 bounded by tube 24 and the connection piece tube 31 for tubes 30, 32 of the inner passageway. Two rubber O-rings 44, 45 prevent the escape of fluid from the chamber 42 past the connection piece 31.

The arrangement is completed by a compressed air line (shown diagrammatically at 48) and a peristaltic pump 50 connected between a tank 52 of bubble solution and branch pipe 40. A needle valve 54 is also included by means of which the pressure of the air flow through the inner passageway can be varied between the pressure at the source 48 (typically up to 2 p.s.i.)

and zero.

The tank 52 may contain any suitable bubble solution, e.g., one part water to two parts of Hyamine (by volume). Hyamine is currently available from Lennig Chemicals Limited of Croydon, England. As an alternative, a solution of a commercially available washing up fluid could be used.

To commence operation and assuming the wind tunnel has been switched on, the peristaltic pump is started to pump solution into chamber 42 at a suitable rate e.g. of the order of 3–5 cc/minute with the illustrated embodiment. The needle valve 54, which has been previously closed, is now opened gradually to allow an air flow through passageway 16. Initially bubbles will be discharged from end 20 of the device in an uneven fashion and the bubbles will usually be badly formed. However, as the air flow through passageway 16 is gradually increased, the bubble discharge will finally reach a steady discharge of well formed bubbles (of about ⅜ inch diameter) and the needle valve can be left at its then setting.

In operation, the major part of the boundary layer formed on the upstream side of shaped portion 15 will tend towards the support portion 14 of the device away from outlet port 20 so that any flow disturbance produced by the device downstream of port 20 will be negligible and almost entirely restricted to that produced by the small length of the discharge portion located to the right of line B-B.

FIGS. 2–5 show other devices in accordance with the invention in which the operational advantages of the first described embodiment will be at least to some extent maintained. The same reference numerals have been used to indicate corresponding parts in the different embodiments.

Figure 6:
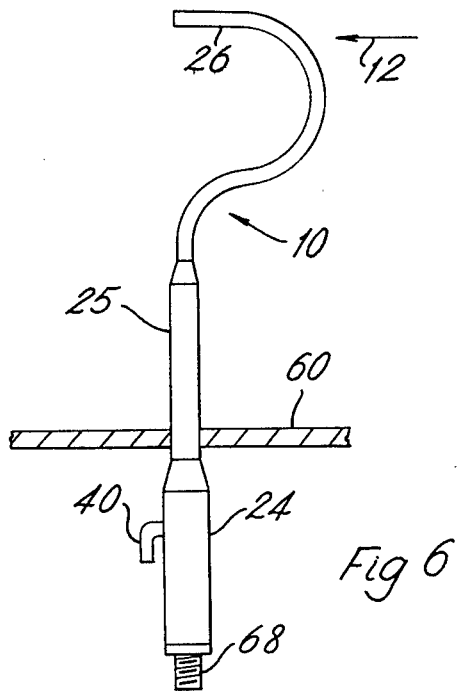
FIG. 6 shows a side view of another bubble generating system utilising the embodiment of FIG. 1.

Although FIGS. 1–5 are plan views of the device and the wall 13 is a side wall of the wind tunnel, it will be appreciated that the devices of the present invention can be used in any other desired orientation. FIG. 6, for example, is a side view showing the first embodiment supported from the floor 60 of the tunnel. Equally well of course the device could be supported from the roof or from one of the four corner edges of the tunnel. In all cases, however, it is desirable to have the support portion substantially perpendicular to the longitudinal axis of the wind tunnel. It will also be understood of course that the device is not limited to use in any particular shape of tunnel. It can, for example, be used equally well in tunnels of square, rectangular, octagonal, circular or any other suitable cross-section.

Figure 7:
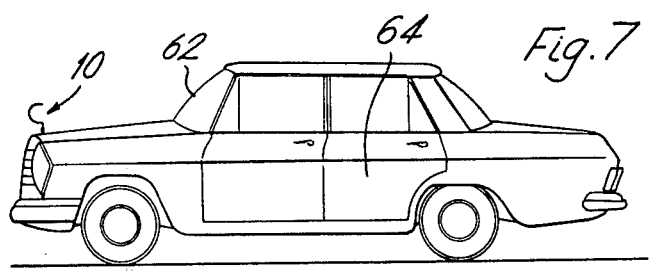
FIG. 7 shows a schematic side view indicating another use of a device in accordance with the invention.

Although operation of the device has been described above by way of example in connection with a wind tunnel, it is not limited to this use. For instance as shown in FIG. 7 the device 10 could be used in the atmosphere, e.g., to provide a bubble flow over the windscreen 62 of a moving car 64.

Figure 8:
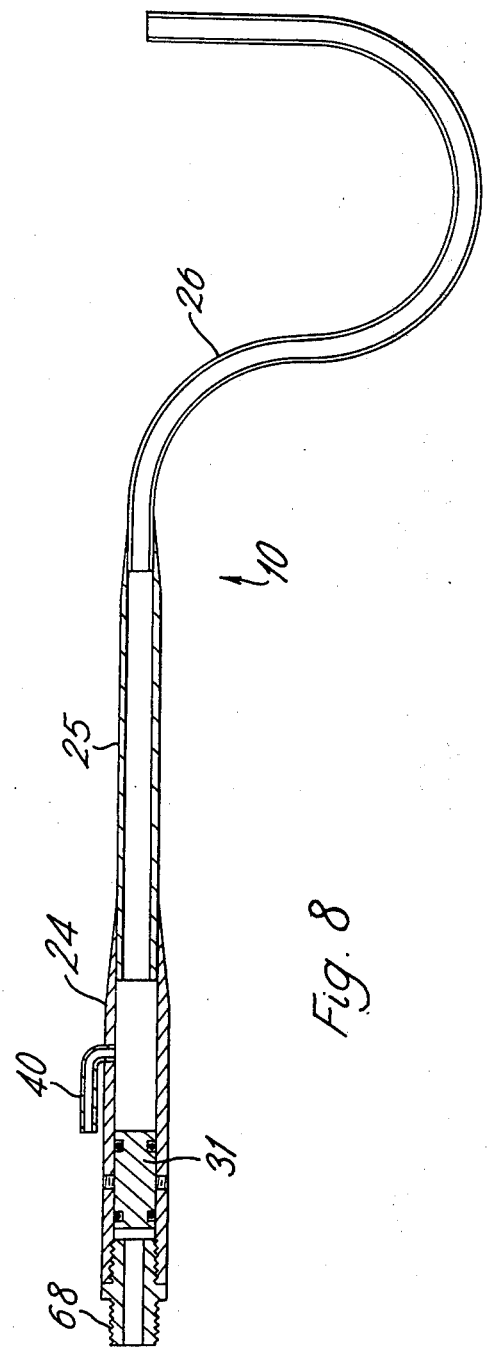
FIG. 8 is a plan view of a modified form of the device shown in FIG. 1.

Nor need the ambient flow necessarily be gaseous and the device could be used in liquid flows in which case the inner series of tubes could be omitted if desired and air, or a coloured liquid (e.g. a solution of fluorescein, or fluorescein sodium, in water), fed in at branch pipe 40 could be discharged as bubbles from the device to be entrained in the surrounding flow. FIG. 8 shows one such case in which the device differs from that of FIG. 1 essentially only in that the inner series of tubes is absent and that connection piece 31 is solid instead of tubular. It will be understood that the embodiments of FIGS. 2–5 can be similarly modified.

Figure 9:
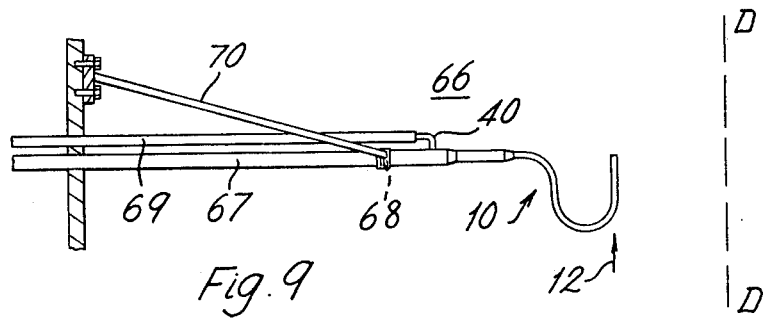
FIG. 9 shows a plan view illustrating the use of extension tubes for the embodiment of FIG. 1.

If the discharge end of the device has to be located further from the device support, e.g., as when the device is used in larger wind tunnels than those shown in FIGS. 1–6, then extension pieces may be needed. FIG. 9 shows by way of example one such case in which the device of FIG. 1 is being mounted for use in an 8 foot diameter square section wind tunnel 66. Reference numeral 67 indicates the extension pieces which are screwed into a connector 68 (shown in FIGS. 1–6) to position the discharge outlet of the device in the desired location, e.g., near the center line D—D of the wind tunnel. Reference numeral 69 indicates the feed tube to branch pipe 40, and numeral 70 a strut to support connector 68 to give the assembly greater rigidity. Obviously the embodiments of FIGS. 1–8 can be similarly modified where circumstances so dictate.

It will be appreciated that if the outlet port of the device 10 lies on the extended axis A—A of the support portion, any unintentional change in orientation of the device does not substantially alter the point of introduction of the tracer bubbles into the flow 12.

Although in the operation of the embodiments described above, air has been chosen as the bubble gas, obviously other gases could, if desired, be used instead.

I claim:

1. A device for generating bubbles in a direction of fluid flow, the device comprising:
   a support portion having an inlet adapted to be supplied from a source of material used in forming bubbles and having at least one end thereof a substantially linear axis;
   a curved portion joined to said one end of the support portion, said curved portion, with increasing distance from the support portion, bending away from and then back towards an extension of said axis from the support portion, said curved portion being bent away from the support portion in a direction opposite that of the fluid flow; and
   at least one passage within the support and curved portions, said passage extending from the inlet of said support portion to an outlet port from the curved portion.

2. A device as claimed in claim 1 in which two passages are provided by two tube assemblies, one within the other, the end of one of said tubes at the support portion being joined to said inlet and the end of the other of said tubes at the support portion being adapted to be supplied from a second source of material used in forming bubbles.

3. A device as claimed in claim 2 in which the inner assembly stops short of the outer assembly at the outlet port of the device.

4. A device as claimed in claim 3 in which the inner assembly stops short of the outer assembly by an amount roughly equal to half the internal diameter of the outer assembly at the outlet port of the device.

5. A device as claimed in claim 2 in which the tubes in the two assemblies are co-axial at least immediately adjacent the outlet port of the device.

6. A device as claimed in claim 1 in which the second portion of the device terminates as a substantially straight section lying substantially perpendicular to the axis of the support portion.

7. A device as claimed in claim 1 in which the outlet port of the device lies on the extension of the support portion axis.

8. A device as claimed in claim 1 in which the curved portion is bent in a generally U-shape.

* * * * *